US008974751B2

(12) United States Patent
Rodenfels et al.

(10) Patent No.: US 8,974,751 B2
(45) Date of Patent: Mar. 10, 2015

(54) APPARATUS AND METHOD FOR SEPARATING COMPONENTS OF A SAMPLE LIQUID

(75) Inventors: Tobias Rodenfels, Dortmund (DE); Gert Blankenstein, Arlington, MA (US)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 35 days.

(21) Appl. No.: 13/811,735

(22) PCT Filed: Jul. 5, 2011

(86) PCT No.: PCT/EP2011/061307

§ 371 (c)(1), (2), (4) Date: Mar. 22, 2013

(87) PCT Pub. No.: WO2012/019829

PCT Pub. Date: Feb. 16, 2012

(65) Prior Publication Data

US 2013/0202500 A1 Aug. 8, 2013

(30) Foreign Application Priority Data

Jul. 27, 2010 (EP) .................................... 10007768

(51) Int. Cl.
*B01D 21/00* (2006.01)
*B01L 3/00* (2006.01)

(52) U.S. Cl.
CPC ........... *B01L 3/508* (2013.01); *B01L 3/502753* (2013.01); *B01L 3/502723* (2013.01); *B01L 2200/0621* (2013.01); *B01L 2300/0681* (2013.01)
USPC ....... 422/527; 422/52; 422/82.05; 422/82.06; 422/82.07; 422/82.08; 422/82.09; 422/82.11; 422/407; 422/500; 422/501; 422/502; 422/503; 422/504; 422/534; 422/930

(58) Field of Classification Search
CPC ...... B01D 61/18; B01D 63/08; B01D 63/088; B01L 2300/0883; B01L 2300/0864; B01L 2300/0681; B01L 9/527; B01L 2300/0861
USPC ............... 422/52, 82.05, 82.06, 82.07, 82.08, 422/82.09, 82.11, 407, 500, 501, 502, 503, 422/504, 527, 534, 930
See application file for complete search history.

(56) References Cited

U.S. PATENT DOCUMENTS

| | | | |
|---|---|---|---|
| 5,135,719 | A | 8/1992 | Hillman et al. |
| 2009/0009752 | A1 | 1/2009 | Duggan et al. |

FOREIGN PATENT DOCUMENTS

| | | | |
|---|---|---|---|
| EP | 1500937 A1 | 1/2005 | |
| WO | 2006071307 A1 | 7/2006 | |
| WO | 2007090620 A2 | 8/2007 | |

OTHER PUBLICATIONS

International Search Report, Form PCT/ISA/210, for corresponding PCT/EP2011/061307; date of mailing: Jan. 20, 2012.

*Primary Examiner* — Dennis M White
(74) *Attorney, Agent, or Firm* — Michael P. Morris; Mary-Ellen M. Devlin

(57) ABSTRACT

Sample liquid is collected in a chamber downstream of a separating device. Adjoining the chamber are a plurality of channels which guide the sample liquid to one or more investigating regions.

14 Claims, 2 Drawing Sheets

APPARATUS AND METHOD FOR SEPARATING COMPONENTS OF A SAMPLE LIQUID

The present invention relates to an apparatus for treating and preferably examining sample liquid, particularly blood, and a process for this purpose.

The present invention is particularly concerned with microfluidic systems or apparatus. The following remarks therefore relate particularly to apparatus in which capillary forces come into effect and in particular are critical to the function.

There are known apparatus in which blood as the sample liquid is filtered by means of a planar separating device. The filtrate or the permeate is held in a chamber flatly adjoining the separating device and is drained away laterally through an adjacent channel. Usually, the channel has a substantially smaller cross-section than the chamber. It is also known to provide the chamber under the separating device with fluidic structures such as columns or the like, so as to achieve as uniform a distribution as possible and accordingly ensure good removal or drainage through the channel. However, fluidic structures of this kind are not ideal, because of their larger dead volume which varies.

Similar apparatus for separating blood are known for example from WO 2005/119211 A1 and WO 2009/106331 A2. According to WO 2009/106331 A2 it is also possible for the flat, thin separating device to be somewhat deformed transversely of its planar dimension, particularly into the chamber adjoining the separating device on the outflow side.

Tests have shown that even when the channel extends into the middle of the chamber or below the separating device, with the lowest possible chamber height, i.e. with the smallest possible spacing from the separating device and a correspondingly small dead volume, drainage from the chamber under the separating device is not very uniform. Rather, the pores of the separating device clog up with blood cells or other components that have been filtered out, essentially only in the region of the channel. Accordingly, optimum throughput is not achieved, particularly in processes that operate by capillary force.

The present patent application is based on the problem of providing an apparatus and a process for the treatment and preferably investigation of sample liquid, particularly blood, in which the fluidic throughput is optimised by simple means and/or an excessively increased dead volume is avoided.

The above problem is solved by an apparatus or a process according to the disclosed embodiments.

A fundamental idea of the present invention is to drain off the sample liquid from the chamber adjoining the separating device on the outflow side—particularly directly and/or flatly—not only through one channel but through at least two channels and accordingly not via only one outflow region but via at least two lateral outflow regions. In this way a substantially higher throughput or a substantially larger amount of sample liquid can be drained off easily and/or with minimal increase to the dead volume. This can be explained in particular by the fact that there is better drainage from different areas of the substantially flat or planar chamber and hence also from different areas of the planar separating device. Accordingly, the permeability of the separating device for the sample liquid is better utilised in a larger area than would otherwise be the case when drainage takes place only through one channel with a small cross-section.

The sample liquid drained off from the two channels, i.e. the sample liquid such as blood plasma or blood serum filtered by the separating device, can then be supplied for example to a common investigating area or, alternatively, to two separate investigating areas. In the former case the channels preferably converge in a connecting chamber or connecting line which is particularly preferably ventilated to avoid unwanted effects of gas or air, particularly in channels that fill up at different rates.

Other advantages, features, properties and aspects of the present invention will become apparent from the claims and the description of preferred embodiments by reference to the drawings, wherein:

In the figures, the same reference numerals are used for identical or similar parts, where corresponding or comparable properties and advantages are obtained even if the description is not repeated.

Figure 1:
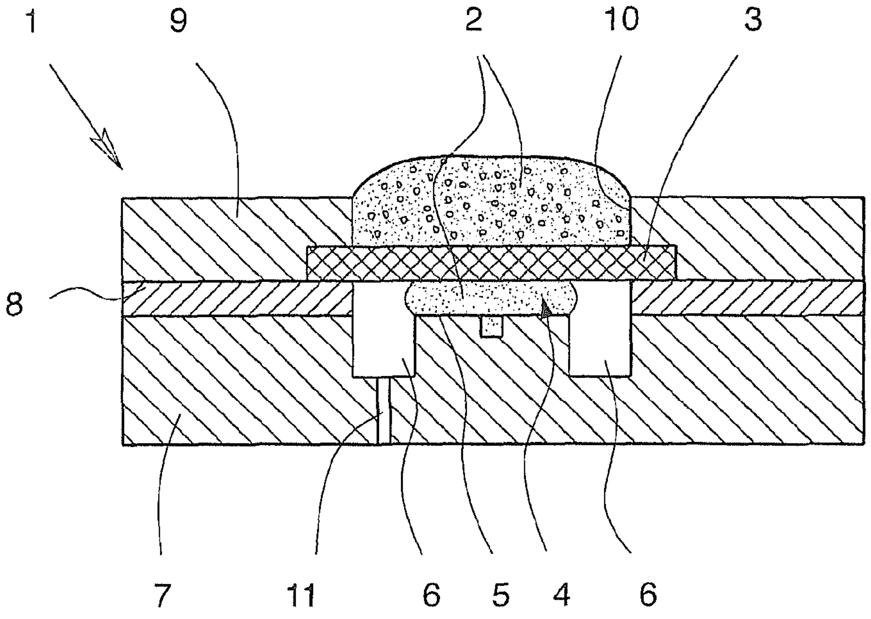
FIG. 1 is a schematic section through a proposed apparatus.

FIG. 1 shows, in schematic section, a proposed apparatus 1 for the treatment and preferably investigation of sample liquid 2, particularly blood or another human or animal bodily fluid. The apparatus 1 comprises a flat separating device 3 for treating the sample liquid 2, particularly for separating components such as particles or cells, from the sample liquid 2. In particular, the separating device 3 is used for filtering. It preferably comprises a filter element, a membrane or the like. The separating device 3 may be configured in a single layer or in several layers. It is preferably flat or planar in configuration.

Particularly preferably, the separating device 3 may be formed by or provided with a membrane as described in WO 2009/106331 A2, which is thus incorporated by reference as a supplementary disclosure.

The apparatus 1 comprises a chamber 4 for receiving sample liquid 2 flowing through the separating device 3. In particular, the chamber 4 thus receives sample liquid 2 such as blood plasma or blood serum that has been treated or filtered by the separating device 3.

The chamber 4 is preferably directly adjacent, with its flat side, to the separating device 3 on the outflow side. In particular the chamber 4 is arranged under the separating device 3. In the embodiment shown the separating device 3 is larger in surface area than the chamber 4. In particular, the separating device 3 projects laterally beyond the chamber 4, most preferably on all sides in the embodiment shown.

Particularly preferably, the sample liquid 2 is guided within the chamber 4 without any side walls. In the embodiment shown this is achieved in particular by the fact that, laterally adjoining a base 5 of the chamber 4, is a capillary stop which is particularly preferably formed by an encircling or laterally adjacent trench 6. However, other design solutions are also possible.

In the embodiment shown the chamber 4 is particularly formed between the base 5 of the chamber 4 on the one hand and the opposite region of the separating device 3. Because of the small spacing between these two opposing surfaces, the sample liquid 2 is preferably held in the chamber 4 by capillary forces, without any side walls. The capillary forces or the capillary stop prevent the sample liquid 2 from flowing into the trench 6 that is laterally adjacent in the embodiment shown. In particular, the trench 6 forms the capillary stop by its abrupt increase in cross-section—i.e. its greater depth in relation to the height of the chamber (distance of the base 5 from the separating device 3).

In the embodiment shown the apparatus 1 preferably comprises a carrier 7, an associated cover 8 and/or a receiving element 9.

The carrier 7 is preferably plate-shaped and/or rigid in its construction.

The carrier 7 is preferably made of plastics and/or by injection moulding. The carrier 7 preferably comprises microfluidic structures for the sample liquid 2 and/or venting structures or the like, which will be discussed in more detail hereinafter. These structures are preferably—at least partly—covered by the cover 8.

The cover 8 is preferably made of plastics and/or embodied as a film. The cover 8 is preferably laminated or stuck onto the carrier 7 or attached thereto by some other method.

The cover 8 preferably extends at least substantially continuously or over the entire surface of the carrier 7.

The receiving element 9 preferably serves to hold the separating device 3 and/or receive the sample liquid 2, such as a drop of blood, as shown in FIG. 1. The receiving element 9 comprises for this purpose a receiving region 10, for example, such as an aperture, opening or the like.

The separating device 3 may for example be held in an annular shoulder or the like on the receiving element 9.

The separating device 3 is attached to or held by the receiving element 9 and/or the carrier 7 or cover 8 for example by gluing, clamping and/or welding or by any other suitable method.

In the embodiment shown the receiving element 9 is mounted on the cover 8 or attached thereto. However, the receiving element 9 may also be directly connected to the carrier 7 and/or formed thereby.

In order to achieve a preferably lateral venting of the chamber 4, the trench 6 is preferably connected to the atmosphere through a venting channel 11. Particularly preferably, the venting channel 11 is formed in the carrier 7. However, other design solutions for venting are also possible.

In the present description, the sample liquid 2 that flows through or is filtered by the separating device 3 is also referred to as the sample liquid 2. FIG. 1 shows, purely schematically, that the sample liquid may contain, upstream of the separating device 3, larger components, shown schematically for example, which are no longer present in the sample liquid 2 after it has flowed through the separating device 3, i.e. in the chamber 4. In particular, the substance present in the chamber 4 or further on in the direction of outflow is then the treated or filtered sample liquid 2 or its permeate. The remainder of the description should be understood in this sense, in particular.

Figure 2:
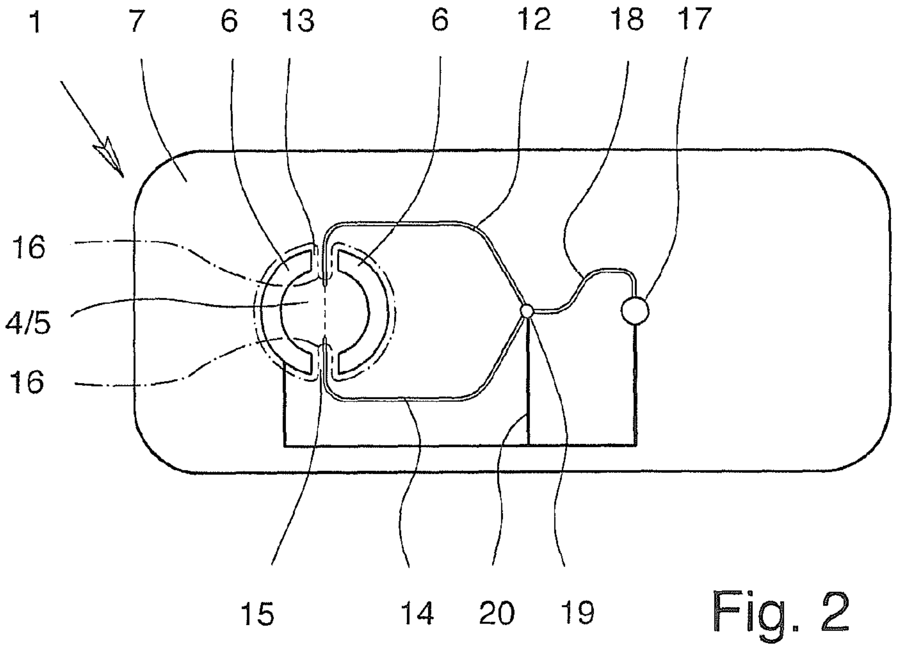
FIG. 2 is a schematic plan view of a carrier of the proposed apparatus according to a first embodiment.

FIG. 2 shows in schematic plan view a preferred fluidic structure for draining the sample liquid 2 away from the chamber 4 of the proposed apparatus 1 according to a first embodiment. In particular, FIG. 2 shows in schematic plan view the carrier 7 with no cover 8, receiving element 9, separating device 3 or sample liquid 2.

The apparatus 1 comprises a first channel 12 which laterally adjoins the chamber 4 in a first outflow region 13. The apparatus 1 further comprises at least one second channel 14, which laterally adjoins the chamber 4 in a second outflow region 15.

The apparatus 1 thus comprises a plurality of channels 12, 14 and outflow regions 13, 15 for draining sample liquid 2 out of the chamber 4.

The channels 12, 14 have a substantially smaller cross-section compared with the chamber 4. The channels 12, 14 preferably each have a minimum or average cross-section or a cross-section in the vicinity of the respective outflow region 13/15 which is less than 20%, preferably less than 15%, particularly less than 10%, particularly preferably less than 5% of the maximum cross-section of the chamber 4. The maximum cross-section of the chamber 4 is to be understood here as being, in particular, the product of the chamber height by the average or maximum diameter of the base 5.

The chambers 12, 14 or outflow regions 13, 15 are preferably offset on the edges of the chamber 4 or are arranged on or attached to opposite sides. Accordingly, the sample liquid 2 is drained from the chamber 4 from different areas or at different points, as a result of which the throughput of the apparatus 1 or the separating or filtering performance of the apparatus 1 or separating device 3 can surprisingly easily be increased substantially, as already explained hereinbefore.

Of course, more than two channels and outflow regions for draining sample liquid 2 out of the chamber 4 may be laterally connected to the chamber 4. Thus the throughput or drainage of sample liquid 2 can be increased still further. A cross-shaped arrangement of four channels and outflow regions on the chamber 4 is possible, for example.

It can be seen from FIG. 2 that the lateral trench 6 is subdivided by the outflow regions 13, 15 into two trench sections which surround the chamber 4 or its base 5 in the manner of annular segments, in particular. The outflow regions 13, 15, in particular, thus form strut-like or bridge-like connections over the trench 6 to the chamber 4 or its base 5. However, other design solutions are also possible.

The channels 12, 14 are preferably formed by channel- or groove-like recesses, particularly in the carrier 7.

The channels 12, 14 preferably extend into or over the outflow regions 13, 15, particularly preferably into the chamber 4 or the base 5 and/or under the separating device 3. In particular, the channels 12, 14 towards the separating device 3 are open-ended in their respective end regions. The cover 8 that otherwise covers the channels 12, 14 may, if necessary, also extend, especially like a tongue, into or over the outflow regions 13, 15 and/or into the chamber 4 or over the base 5, i.e. it may form tongue-like protuberances 16, as shown by dotted lines in FIG. 2.

The channels 12, 14 may extend at least substantially into the centre of the chamber 4 and/or be connected to one another in the chamber 4 or in the base 5, as shown by dotted lines in FIG. 2.

In the embodiment shown the apparatus 1 has a preferably chamber-like investigating region 17 for investigating sample liquid 2 drained from the chamber 4. For supplying sample liquid 2 from the chamber 4 into the investigating region 17, in the embodiment shown, both the first channel 12 and also the second channel 14 are fluidically connected to the investigating region 17. This may be chosen to be done directly or optionally through a connecting line 18 and/or a connecting chamber 19, as shown in FIG. 2. The connecting line 18 and the connecting chamber 19 are thus optional, in particular, and may be omitted if desired.

In the embodiment shown the two channels 12 and 14 are initially combined and the sample liquid 2 drained off from the chamber 4 is then conveyed through the common connecting line 18 to the investigating region 17. The optional connecting chamber 19 is preferably formed at the junction of the two channels 12 and 14 or at the transition to the connecting line 18. However, as already stated, this is purely optional and may be omitted if desired.

Preferably, a vent is provided for the investigating region 17 and/or for the connecting line 18 and/or connecting chamber 19. In the embodiment shown the connecting line 18 or connecting chamber 19 is preferably vented through a venting channel 20 which is preferably connected directly or indirectly to the environment, for example, and/or may be in gas exchange and/or may be vented through or connected to the investigating region 17 and/or trench 6.

The venting provided is preferably configured so that even when the channels 12, 14 are filled at different rates with sample liquid 2 drained from the chamber 4 there is, if possible, no undesirable inclusion of gas or air in the investigating region 17 or in the sample liquid 2 supplied to the investigating region 17.

The venting is preferably also formed by channel- or groove-like depressions and/or openings or the like in the carrier 7 and/or if required in the cover 8.

The connecting chamber 19 is preferably used primarily only for venting and therefore preferably has only a minimal volume.

A second embodiment of the proposed apparatus 1 or microfluidic structure is hereinafter explained by reference to FIG. 3. Only essential differences from the first embodiment are described. The remarks and explanations provided hereinbefore thus apply in a complementary or corresponding capacity.

Figure 3:
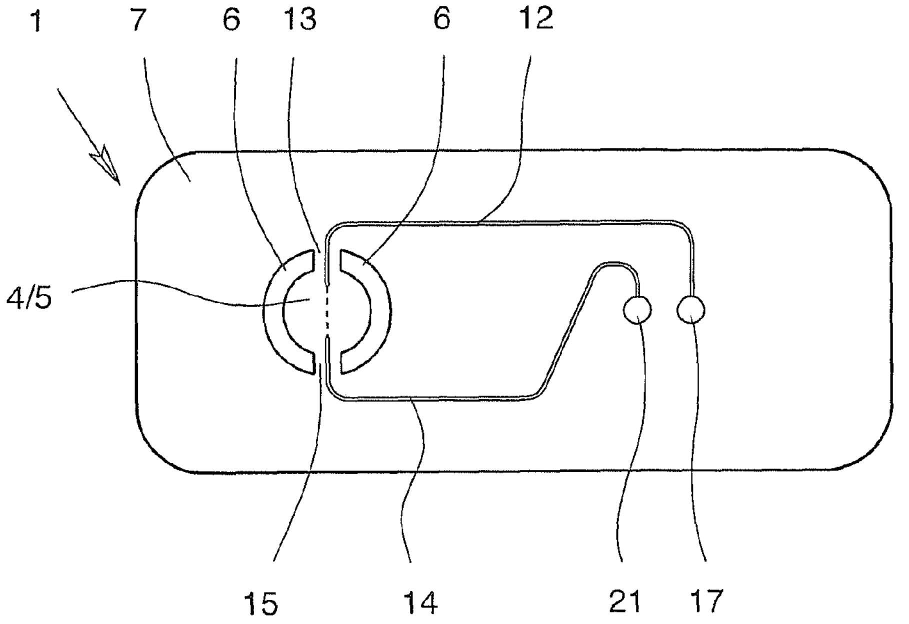
FIG. 3 is a schematic plan view of a carrier of the proposed apparatus according to a second embodiment.

FIG. 3 shows a plan view corresponding to FIG. 2. Some aspects such as the optional venting and the possible protuberances 16 in the cover 8 into the drainage regions 13, 15 or chamber 4 have been omitted but can still be implemented.

In the second embodiment, the two channels 12, 14 are connected to separate investigating regions 17 and 21. Thus, in addition to the (first) investigating region 17 the apparatus 1 comprises a further or additional investigating region 21 which is supplied with sample liquid 2 by the second channel 14.

The two embodiments or individual aspects thereof may also be combined with one another in any desired manner. For example, the connecting line 18 or connecting chamber 19 may also, in addition to the investigating region 17, be connected to another separate investigating region 21 for re-separating or dividing up the sample liquid 2 that has been drained from the chamber 4 after the joining of the channels 12, 14.

Alternatively or additionally, it is also possible, for example, for four channels to drain off the sample liquid 2 from the chamber 4 and to join up in pairs in order to supply the sample liquid 2 to the separate investigating regions 17 and 21.

Generally the following comments can be made on the present invention and the two embodiments:

In particular, the apparatus 1 is a microfluidic device.

The volumes of the apparatus 1 or individual ones or all of the microfluidic structures such as the chamber 4, the channels 12, 14, the connecting line 18, the connecting chamber 19 and/or the investigating regions 17, 21, are preferably less than 1 ml, particularly less than 500 μml, particularly preferably substantially 100 μl or less.

The volume of the channels 12, 14 is preferably less than 20%, more particularly less than 10%, of the volume of the chamber 4.

The preferred draining of the sample liquid 2 from the chamber 4 through a plurality of channels 12, 14, albeit smaller in cross-section than the chamber, has the advantage that even with a minimal volume for the chamber 4, particularly a minimal chamber height or very little or no microstructuring of the chamber 4 or chamber 5 in order to minimise the dead volume, a good throughput or a high separating performance can be achieved. Alternatively or additionally, even when a channel 12 or 14 is out of commission or blocked, the sample liquid 2 can be treated and in particular investigated if the two channels 12, 14 are fluidically connected to a common investigating region. When the liquid is drained into separate investigating regions 17 and 21, by using a plurality of channels 12, 14, it is also possible to achieve faster filling of the investigating regions 17 and 21 compared with the prior art.

The channels 12 and 14 preferably extend at least substantially in the main plane of extent of the chamber 4 or carrier 7 and/or in a plane parallel thereto.

The apparatus 1 may be used in particular to investigate the sample liquid 2 or to measure an analyte in the sample liquid 2 or the like. For example, the apparatus 1 may be used to carry out an immunoassay reaction or the like. For example, the apparatus 1 may be used to measure or analyse certain analytes or other values of the sample liquid 2.

LIST OF REFERENCE NUMERALS

1 apparatus
2 sample liquid
3 separating device
4 chamber
5 base
6 trench
7 carrier
8 cover
9 receiving element
10 receiving region
11 venting channel
12 first channel
13 first drainage region
14 second channel
15 second drainage region
16 protuberance
17 investigating region
18 connecting line
19 connecting chamber
20 venting channel
21 additional investigating region

The invention claimed is:

1. An apparatus (1) for treating or investigating sample liquid (2), comprising:

a carrier (7), a chamber (4) within the carrier and having a base portion (5), a trench (6) disposed within the carrier (7) and substantially surrounding the chamber (4), where the trench has a depth into the carrier (7) deeper than the base portion (5) of the chamber such that the chamber (4) is substantially without side-walls, a separating device (3) disposed above and spaced apart from the base portion (5) of the chamber (4), the separating device (3) extending laterally over and beyond the trench (6), and the separating device (3) being configured to receive and convey the sample liquid (2) to the chamber (4), a first channel (12), which laterally traverses the trench (6), extends into and adjoins a central portion of the chamber (4) through a first draining region (13), and has a substantially smaller cross-section than the chamber (4), a second channel (14), which laterally traverses the trench (6), extends into and adjoins a central portion of the chamber (4) through a second draining region (15), and has a substantially smaller cross-section than the chamber (4), and an investigating region (17), to which at least one of the first channel (12) and the second channel (14) is fluidically connected, in order to drain sample liquid (2) from the chamber (4) into the investigating region (17).

2. The apparatus according to claim 1, wherein both the first channel (12) and the second channel (14) are fluidically connected to the investigating region (17), in order to drain sample liquid (2) from the chamber (4) into the investigating region (17).

3. The apparatus according to claim 1, further comprising at least one of a connecting line (18) and a connecting chamber (19) to which the first and second channels (12, 14) are fluidically connected upstream of the investigating region (17).

4. The apparatus according to claim 3, further comprising a vent for at least one of the connecting line (18) and the connecting chamber (19).

5. The apparatus according to claim 3, wherein at least one of the connecting line (18) and the connecting chamber (19) is connected to the investigating region (17) for supplying sample liquid (2).

6. The apparatus according to claim 1, wherein the second channel (12) is fluidically connected to a separate, additional investigating region (21), for conveying sample liquid (2) from the chamber (4) into the additional investigating region (21).

7. The apparatus according to claim 1, wherein the first and second draining regions (13, 15) are arranged at a peripheral edge of the chamber (4).

8. The apparatus according to claim 7, wherein the first and second draining regions (13, 15) are arranged on opposite sides of the chamber (4).

9. The apparatus according to claim 1, wherein the first and second channels (12, 14) extend below the separating device (3).

10. The apparatus according to claim 1, wherein the first and second channels (12, 14) are formed by at least one of groove- and channel-like depressions in at least one of the base (5) of the chamber (4) and the first and second draining regions (13, 15).

11. The apparatus according to claim 10, further comprising a cover (8) extending at least one of: over the first and second draining regions (13, 15) and below the separating device (3), wherein the cover (8) covers the first and second channels (12, 14).

12. The apparatus according to claim 1, wherein the first and second channels (12, 14) are at least partly formed by at least one of groove- and channel-like recesses in the carrier (7) of the apparatus (1) and covered by a cover (8).

13. The apparatus according to claim 1, wherein the first and second channels (12, 14) are connected to one another under the separating device (3).

14. The apparatus according to claim 1, wherein the trench (6) is interrupted by the first and second draining regions (13, 15).

* * * * *